United States Patent
Tichy et al.

(10) Patent No.: US 10,788,132 B2
(45) Date of Patent: Sep. 29, 2020

(54) HYDRAULIC CHANGEOVER VALVE

(71) Applicant: Graco Minnesota Inc., Minneapolis, MN (US)

(72) Inventors: Dustin A. Tichy, Otsego, MN (US); Stephen L. Van Krevelen, East Bethel, MN (US); Suresha Saragur Nijaguna, Plymouth, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 104 days.

(21) Appl. No.: 15/976,095

(22) Filed: May 10, 2018

(65) Prior Publication Data

US 2018/0328499 A1 Nov. 15, 2018

Related U.S. Application Data

(60) Provisional application No. 62/504,266, filed on May 10, 2017.

(51) Int. Cl.
*F16K 11/02* (2006.01)
*F16N 25/00* (2006.01)
*F16N 7/38* (2006.01)

(52) U.S. Cl.
CPC .............. *F16K 11/02* (2013.01); *F16N 25/00* (2013.01); *F16N 7/385* (2013.01); *F16N 2280/00* (2013.01)

(58) Field of Classification Search
CPC .......... F16K 11/02; F16K 11/07; F16N 25/00; F16N 25/02; F16N 7/385; F16N 2280/00; F16N 2280/04; Y10T 137/8671; Y10T 137/8663

USPC ........................................ 137/625.69, 625.66
See application file for complete search history.

(56) References Cited

U.S. PATENT DOCUMENTS

| | | |
|---|---|---|
| 2,739,671 A | 3/1956 | Edge et al. |
| 3,074,509 A | 1/1963 | Robson |
| 3,414,085 A | 12/1968 | Fujita |
| 4,105,094 A | 8/1978 | Callahan |
| 4,180,090 A | 12/1979 | Bemba |
| 4,186,821 A | 2/1980 | Wegmann |
| 4,502,567 A | 3/1985 | Karcher |
| 4,572,331 A | 2/1986 | Powell et al. |
| 4,712,649 A * | 12/1987 | Saam ..................... F16N 25/02 184/7.4 |
| 6,581,624 B1 | 6/2003 | Magami et al. |
| 8,978,825 B2 | 3/2015 | Conley et al. |
| 9,151,444 B2 | 10/2015 | Powell |

(Continued)

*Primary Examiner* — Kelsey E Cary
(74) *Attorney, Agent, or Firm* — Kinney & Lange, P.A.

(57) ABSTRACT

A changeover valve for a single line parallel lubrication system includes a base housing, a first housing, and a second housing, which are distinct and separable units arranged to provide direct fluid communication between base housing, first housing, and second housing fluid channels. The base housing includes a plurality of fluid channels. The first and second housings each include a spool mounted in a cylindrical bore and hydraulically displaceable between ends of the cylindrical bore and a plurality of fluid channels fluidly connected to the cylindrical bore. The first and second housings are configured to mate with the base housing in a fluid seal. At least one of the base housing, first housing, and second housing includes and a relief valve in fluid communication with one or more of the plurality of base housing, first housing, and second housing fluid channels.

19 Claims, 6 Drawing Sheets

(56) References Cited

U.S. PATENT DOCUMENTS

| | | |
|---|---|---|
| 9,212,781 B2 | 12/2015 | Roys |
| 2013/0277147 A1* | 10/2013 | Conley .................. F16N 7/385 184/6 |
| 2013/0277148 A1 | 10/2013 | Beck et al. |
| 2014/0144536 A1* | 5/2014 | Roys ....................... F16K 11/07 137/884 |
| 2015/0377229 A1 | 12/2015 | Immonen et al. |

* cited by examiner

HYDRAULIC CHANGEOVER VALVE

CROSS-REFERENCE TO RELATED APPLICATION(S)

This application claims the benefit of U.S. Provisional Application No. 62/504,266 filed May 10, 2017 for "Hydraulic Changeover Valve" by D. Tichy, S. Van Krevelen, and S. Nijaguna.

BACKGROUND

The present invention is related generally to lubrication systems and, more particularly, to single line parallel lubrication systems.

Machinery often requires lubrication to function. Seals, pistons, bearings, and other components require lubrication with small, measured amounts of grease or oil over short, frequent time intervals to prevent wear, corrosion, over-lubrication, or under-lubrication. Lubricant fluid is injected by lubricant injectors positioned at specific locations that require lubrication. Lubricant is drawn from a lubricant reservoir and pumped to the lubricant injectors via a lubrication supply line. The lubricant injectors are configured to dispense and inject a set, small amount of lubricant to the specific location within the machinery once the pressure within the supply line reaches a predetermined level. After the injectors have dispensed lubricant, the pressure within the supply line must be relieved in order to reset the injectors for another lubrication cycle.

Single line parallel lubrication systems use a central pump to deliver lubricant through a single lubricant supply line to multiple injectors positioned at lubrication points of one or more machines. Once lubricant has been dispensed, the supply line must be vented (relieve pressure), retuning the lubricant in the supply line to the pump reservoir, in order to restore the normal pressure level and reset the injectors for subsequent use. Conventional single line parallel lubrication systems utilize an electric solenoid operated cartridge valve and pressure switch to sense pressure in the supply line and signal a controller to cease pump operation. After the injectors have dispensed the lubricant, pumping is stopped and the solenoid operated cartridge valve is opened to the pump reservoir. Lubricant fluid remaining in the supply line is returned to the pump reservoir, driven by the pressure difference existing between the supply line (high pressure) and pump reservoir (low pressure). Once the pressure in the supply line has been adequately relieved, pumping commences and the solenoid operated cartridge valve closes. The venting process can be slow, particularly in high volume (i.e., longer pipe length) lubrication systems and in cold weather, which can increase the viscosity of the lubricant and restrict flow.

SUMMARY

A changeover valve for a single line parallel lubrication system includes a base housing, a first housing, and a second housing, which are distinct and separable units arranged to provide direct fluid communication between base housing, first housing, and second housing fluid channels. The base housing includes a plurality of fluid channels. The first and second housings each include a spool mounted in a cylindrical bore and hydraulically displaceable between ends of the cylindrical bore and a plurality of fluid channels fluidly connected to the cylindrical bore. The first and second housings are each configured to mate with the base housing in a fluid seal. At least one of the base housing, first housing, and second housing includes and a relief valve in fluid communication with one or more of the plurality of base housing, first housing, and second housing fluid channels.

A method of assembling a changeover valve for a single line parallel lubrication system includes providing a base housing, first housing, and second housing, which are distinct and separable units arranged to provide direct fluid communication between base housing, first housing, and second housing fluid channels, and providing a relief valve in fluid communication with one or more of the plurality of base housing, first housing, and second housing fluid channels. The base housing includes a plurality of base housing fluid channels. The first housing includes a first spool mounted in a first cylindrical bore and hydraulically displaceable between a first and a second end of the first cylindrical bore, and a plurality of first housing fluid channels fluidly connected to the first cylindrical bore. The second housing includes a second spool mounted in a second cylindrical bore and hydraulically displaceable between a third and a fourth end of the second cylindrical bore, and a plurality of second housing fluid channels fluidly connected to the second cylindrical bore.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The disclosed modular changeover valve for use in a single line parallel lubrication system is a fully hydraulic valve capable of pressurizing one supply line while simultaneously venting a separate supply line, while eliminating the need for an electric solenoid operated cartridge valve. The changeover valve operates utilizing two spool valves, which are housed in separate modular blocks or housings for ease of maintenance and replacement. A flush-mount design allows for direct connection with a pump outlet and return reservoir inlet thereby eliminating the need for separate and external fluid lines.

Figure 1:
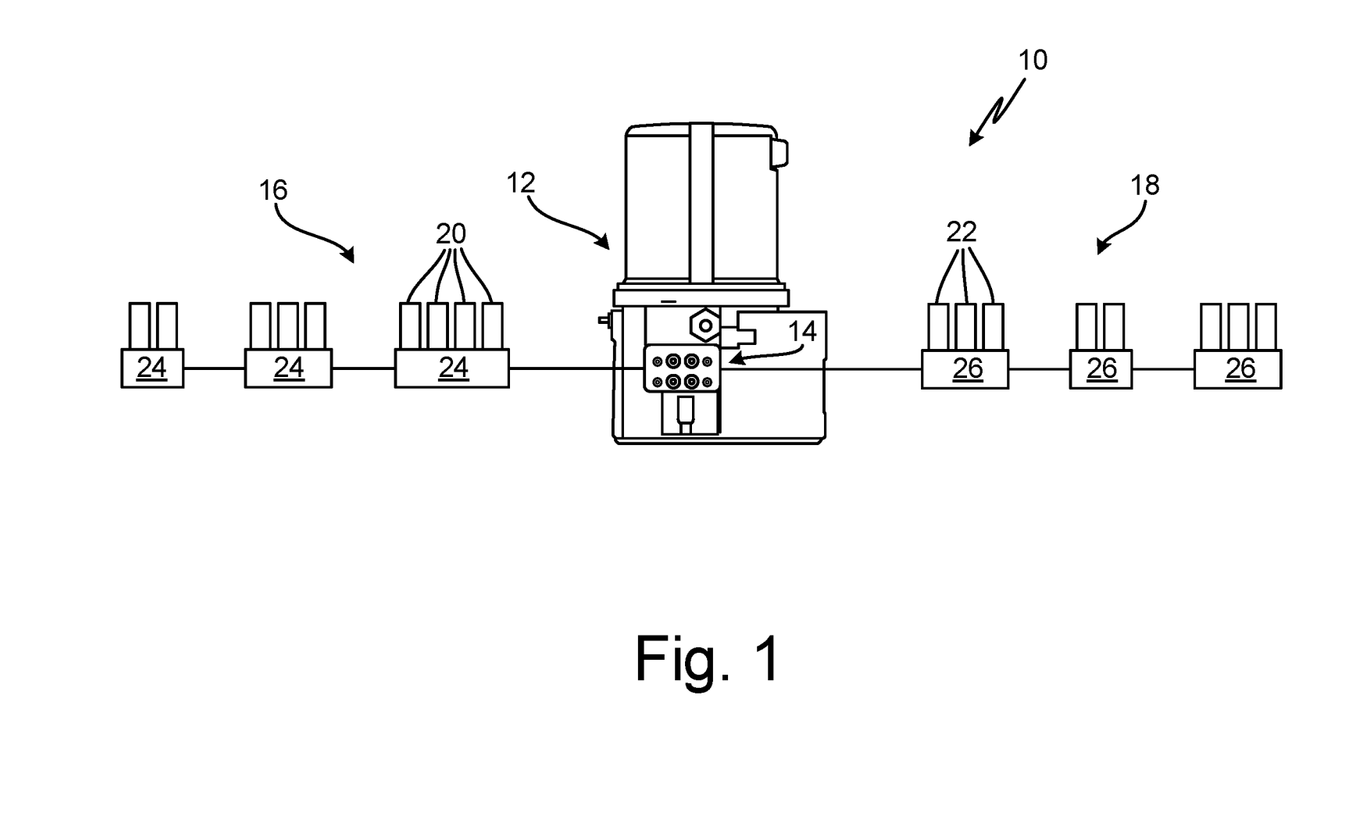
FIG. 1 is a schematic view of a single line parallel lubrication system.

FIG. 1 is a schematic of single line parallel lubrication system 10 with central pump 12, modular changeover valve 14, supply lines 16, 18, injectors 20, 22, and injector manifolds 24, 26. Lubrication system 10 is a dedicated lubrication assembly for use with lubricated machinery (not shown) such as pumps, pistons, seals, bearings, and/or shafts. Central pump 12 includes pump reservoir 27, which stores lubricant for distribution to injectors 20, 22. Pump 12 supplies lubricant (e.g., grease or oil) to injectors 20 via supply line 16 and to injectors 22 via supply line 18. Injectors 20, 22 are hydraulically operated and configured to deliver a metered quantity of lubricant to a lubrication point of a machine. Lubrication system 10 can deliver lubricant to lubrication points on one or more machines. Each supply line 16, 18 can be of varying length and can have one or more injectors 20, 22 located at varying locations along each supply line 16, 18. Injectors 20, 22 can be arranged on injector manifolds 24, 26, respectively. Each manifold 24, 26 can have one or more injectors 20, 22. The number and location of injectors 20, 22, and length of supply lines 16, 18 can be varied depending on the number and location of lubrication points on the one or more machines lubrication system 10 services.

Each lubricant injector 20, 22 is configured to dispense lubricant when the lubricant pressure in the respective supply line 16, 18 has reached a predetermined level. When the lubricant pressure reaches the predetermined level, injectors 20, 22 are triggered and dispense a set volume of lubricant to the lubrication point (not shown). After injectors 20, 22 have dispensed lubricant, a set volume of lubricant is metered for application during the next lubrication cycle. Once all injectors 20, 22 in the supply line 16, 18 have dispensed lubricant, the lubricant is vented or redirected from the supply line 16, 18 back to pump reservoir 27. Venting relieves pressure in the supply line 16, 18, which allows injectors 20, 22 to reset for another lubrication cycle. The process of venting is driven by a pressure difference between supply line 16, 18 (high pressure) and pump reservoir 27 (low pressure). The venting process can be slow, particularly in high volume lubrication systems and in cold weather, which can increase the viscosity of the lubricant and restrict flow. To minimize downtime of lubrication system 10, the two supply lines 16, 18 can be pressurized in an alternating fashion, such that one supply line 16, 18 can be pressurized while the other supply line 16, 18 is vented. This can be accomplished automatically through implementation of modular changeover valve 14.

Figure 2:
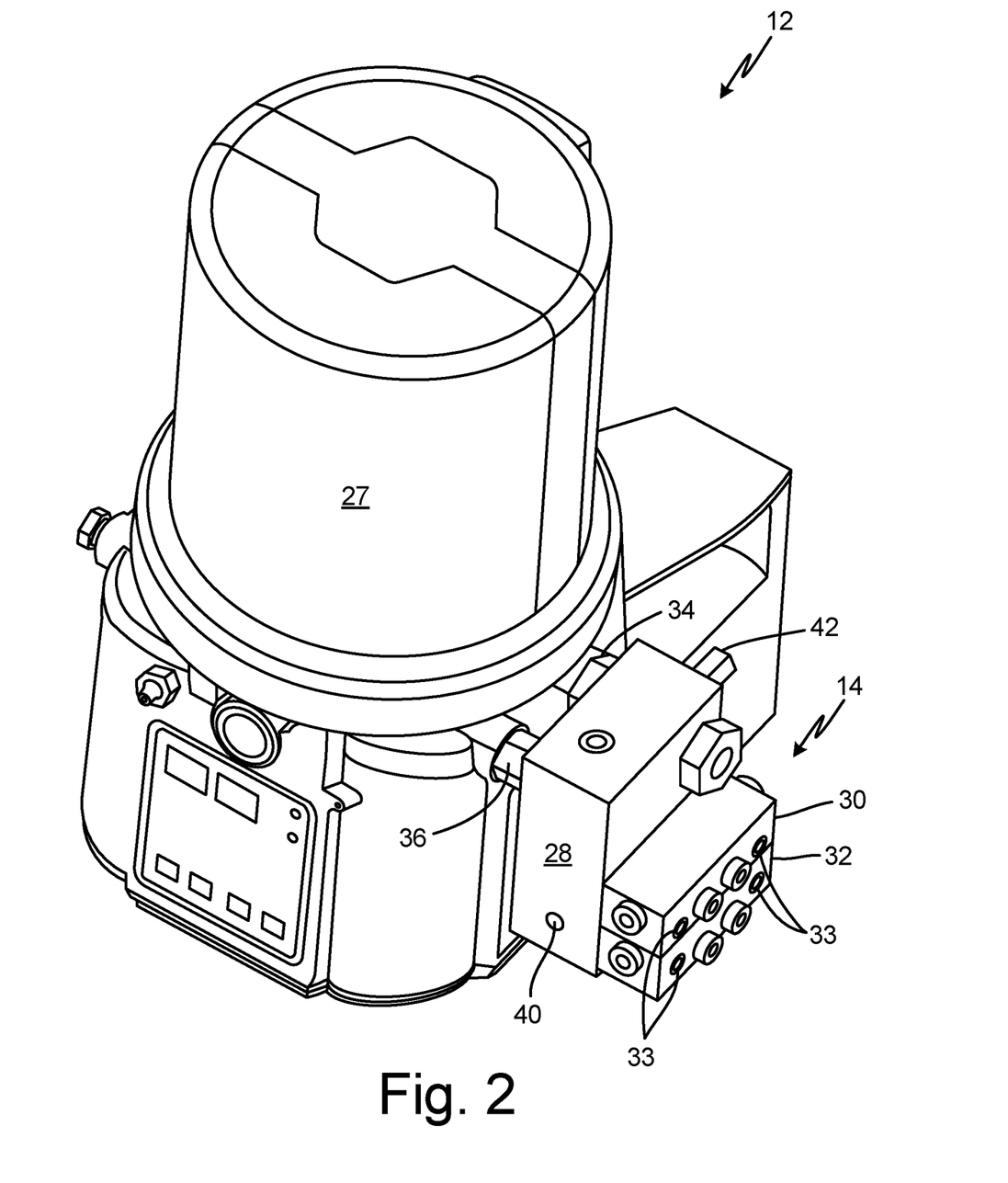
FIG. 2 is a perspective view of the pump of FIG. 1 having a modular changeover valve according the present invention.

Modular changeover valve 14 is configured to automatically switch between pressurizing and venting supply lines 16, 18. As shown in FIG. 2, modular changeover valve 14 includes base housing 28 and separate spool housings 30, 32. Base housing 28 and spool housings 30 and 32 are distinct and separable modular units arranged to provide direct fluid communication between fluid channels of base housing 28 and spool housings 30 and 32. Base housing can be flush-mounted to pump 12 with direct connection to pump lubricant outlet 34 and lubricant reservoir inlet 36. Spool housings 30, 32 can be directly mounted to a front face of base housing 28, such that base housing 28 separates spool housings 30, 32 from pump 12. Base housing 28 and spool housings 30, 32 can be mounted using bolts 33 or other suitable fasteners as known in the art. In one embodiment, spool housings 30, 32 can be tightly secured against the front face of base housing 28 by bolts 33, which extend through a front face of each of the spool housings 30, 32 into the front face of base housing 28. Each of base housing 28 and spool housings 30, 32 include fluid channels (further described with respect to FIGS. 3A-3D), which can be fluidly connected to one another, pump lubricant outlet 34, lubricant reservoir inlet 36 (also referred to herein as return inlet 36), and outlets 38, 40, which connect to supply lines 16, 18, respectively. Fluid channels can be machined into housings 28, 30, and 32 using conventional machining techniques. Housings 30, 32 include spools (not shown). Spool bores (not shown) can be precision honed to fit spool to provide for metal-to-metal sealing between spool lands and bore walls. Fluid connections at interfaces of base housing 28, spool housings 30, 32, and pump 12 can be sealed with O-rings or other suitable seals as known in the art capable of preventing leakage between housings 28, 30, and 32, and pump 12.

As shown in FIG. 2, base housing 28 can also include relief valve 42, which is configured to activate a changeover line (not shown). Relief valve 42 can be an adjustable valve responsive to a differential pressure. Relief valve 42 can be a spring force ball valve, poppet valve, piston spool valve, or other adjustable valve as known in the art. Relief valve 42 is configured to open after a pressure required to actuate injectors 24, 26 has been reached. Generally, the pressure at relief valve 42 must be set higher than the pressure required to actuate injectors 24, 26 to accommodate a difference in pressure across supply lines 16, 18. For example, a pressure of 3000 psi (20,684 kilopascal) may be required at pump 10 (relief valve 42) to meet an actuation pressure of 1000 psi (8,695 kilopascal) at an end of supply lines 16, 18. Generally, the actuation pressure of relief valve 42 is dependent on the length of supply lines 16, 18 and can be set during installation of lubrication system 10. In one non-limiting example, relief valve 42 is a spring force ball valve in which the actuation pressure can be adjusted by manually increasing or decreasing the tension of the spring. The operation of relief valve 42 is described further with respect to FIGS. 3A-3D below. In alternative embodiments, relief valve 42 can be located on either of spool housings 30 and 32.

FIGS. 3A-3D are schematic views of modular changeover valve 14, illustrating changeover phases during operation. Shading is provided to indicate connected lubricant flow-paths. FIGS. 3A-3D illustrate fluid connections between base housing 28 and spool housings 30, 32, and between modular changeover valve 14 and pump 12, via pump outlet 34 and pump reservoir inlet 36, and supply lines 16, 18 via outlets 38, 40. Although, generally referred to herein as "outlets," elements 38 and 40 can function as both outlets and inlets depending on the direction of lubricant flow (i.e., lubricant flows out of changeover valve elements 38, 40 during pressurization of supply lines 16, 18 and flows into changeover valve elements 38, 40 during venting of supply lines 16, 18). As illustrated in FIGS. 2 and 3A-3D, outlets 38, 40 are located on base housing 28. In alternative embodiments, outlets 38, 40 can be located on any of housings 28, 30, and 32.

As shown in FIGS. 3A-3D, base housing 28 includes a plurality of fluid channels 44, 46, 48, 50, 52, 54. Lubricant is delivered from pump outlet 34 to modular changeover valve 14 through a fluid inlet at pump channel 44, which fluidly connects base housing 28 to pump outlet 34. Lubricant is returned to pump reservoir 27 through return channel 46, which fluidly connects base housing 28 to reservoir inlet 36. Fluid channel 48 connects pump channel 44 to changeover channel 50 via relief valve 42 inlet 56 and outlet 57. Relief valve 42 is configured to open and allow lubricant to flow from pump channel 44 when a preset pressure is reached. Fluid channels 52, 54 fluidly connect changeover valve 14 to supply lines 16, 18, respectively, via changeover valve outlets 38, 40 (FIG. 2). As previously discussed, outlets 38, 40 serve as both inlets and outlets for the delivery of lubricant both to and from supply lines 16, 18.

Spool housings 30, 32 are fluidly connected to base housing 28 through one or more of fluid channels 44, 46, 48, 50, 52, 54. Each spool housing 30, 32 includes a single spool 58, 60, mounted in a cylindrical bore 62, 64 and hydraulically displaceable between longitudinally-separated bore ends 66, 68 and 70, 72. In one embodiment (shown in FIGS. 3A-3D), each spool 58, 60 can include three lands 74, 76, 78 and 80, 82, 84 and two grooves 86, 88 and 90, 92. Lands 74, 76, 78 and 80, 82, 84 form a seal against outer walls 94, 96 of the bores 62, 64. Bores 62, 64 can be precision honed to fit spools 58, 60 to provide a seal between lands 74, 76, 78, and 80, 82, 84 and respective bore walls 94, 96 and thereby prevent lubricant flow across lands 74, 76, 78, and 80, 82, 84 within the respective bores 62, 64. Lands 74, 76, 78 on spool 58 and lands 80, 82, 84 on spool 60 are separated from one another across a length of each spool 58, 60, with lands 74, 78 and 80, 84 positioned on opposite ends of spools 58, 60 and separated by land 76, 82. Lands 74, 76, 78 of spool 58 and lands 80, 82, 84 of spool 60 have equal diameters, but can be of varying lengths depending on the location of the fluid channels in fluid communication with bores 62, 64. Grooves 86, 88 and 90, 92 can provide a path for lubricant flow within bores 62, 64.

Spools 58, 60 are positioned within bores 62, 64 by hydraulic pressure provided by the lubricant. The position of each spool 58, 60 determines which supply line 16, 18 will be pressurized and which supply line 16, 18 will be vented. The use of changeover valve 14 allows for the simultaneous pressurization of one supply line 16, 18 and venting of the other supply line 16, 18. Over time, wear of spools 58, 60 and/or buildup of lubricant breakdown products within bores 62 64 can occur, necessitating maintenance or replacement. By locating spools 58, 60 in separate housings 30, 32 and separate from base housing 28, replacement can be limited to the spool housing at issue. The modular changeover valve design of the present invention provides for an efficient and simplified mechanism of operation and maintenance over prior art multi-spool changeover valves. Although the embodiments described herein include two spools, each having three lands and two grooves, it will be understood by one of ordinary skill in the art that the number of lands and grooves can be increased or decreased in alternative embodiments to accommodate varying fluid connections and that the present invention is not limited to the embodiment shown in FIGS. 3A-3D.

The function of changeover valve 14 is illustrated in FIGS. 3A-3D. In a first phase of operation (shown in FIG. 3A), pump 12 delivers lubricant to supply line 18 while lubricant is returned to pump reservoir 27 from supply line 16. Pump outlet 34 is fluidly connected to spool 58 via pump channel 44. Spool 58 is positioned at bore end 68. In this position, groove 86 is open to pump channel 44, which delivers lubricant from pump outlet 34, and fluid channel 54, which delivers lubricant to supply line 18. A portion of lubricant in pump channel 44 is diverted through fluid channel 48 to relief valve 42. Relief valve 42 remains in a closed position until a pressure required to actuate injectors 26 (FIG. 1) is reached. Lubricant is also delivered to spool 60 through fluid channel 98, which is connected to fluid channel 54. Fluid channel 98 is fluidly connected to bore end 70 of spool housing 32. The pressurization of fluid channel 98 and thereby bore end 70 forces spool 60 to opposite bore end 72. In this position, supply line 16 is disconnected from pump channel 44 as long as relief valve 42 remains closed. As such, as fluid line 18 is pressurized, pressure is relieved from fluid line 16 as lubricant is directed back to pump reservoir 27 via fluid channel 52 and return channel 46, which are in fluid connection at groove 88 of spool 58. Pressure is additionally relieved in fluid channels 100 and 102, which are fluidly connected to bore ends 66 (spool 58) and 72 (spool 60), respectively, thereby relieving pressure between spools 58 and 60.

Figure 3A:
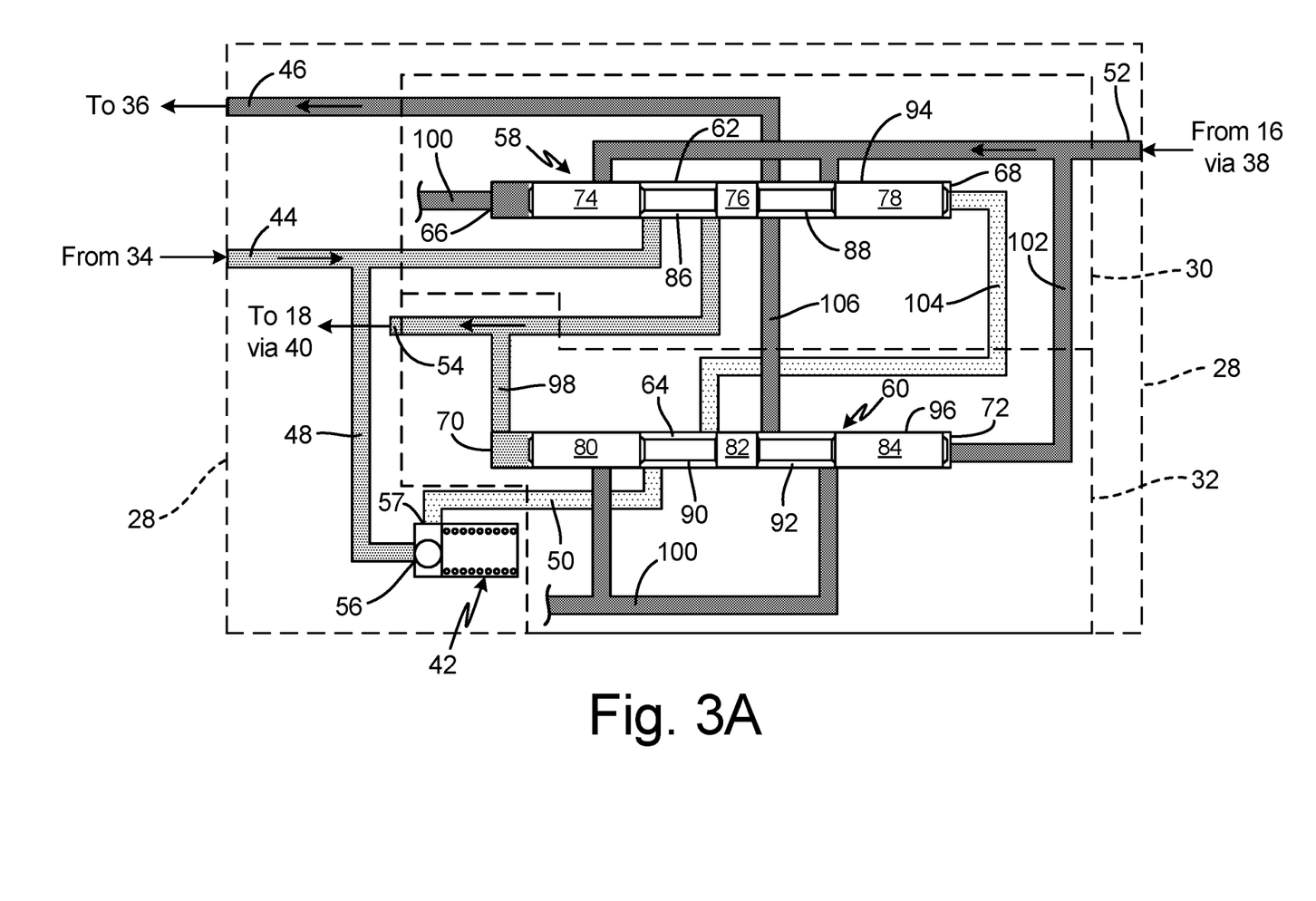
FIGS. 3A-3D are schematic views of the modular changeover valve of FIG. 2, illustrating changeover phases during operation.
Figure 3B:
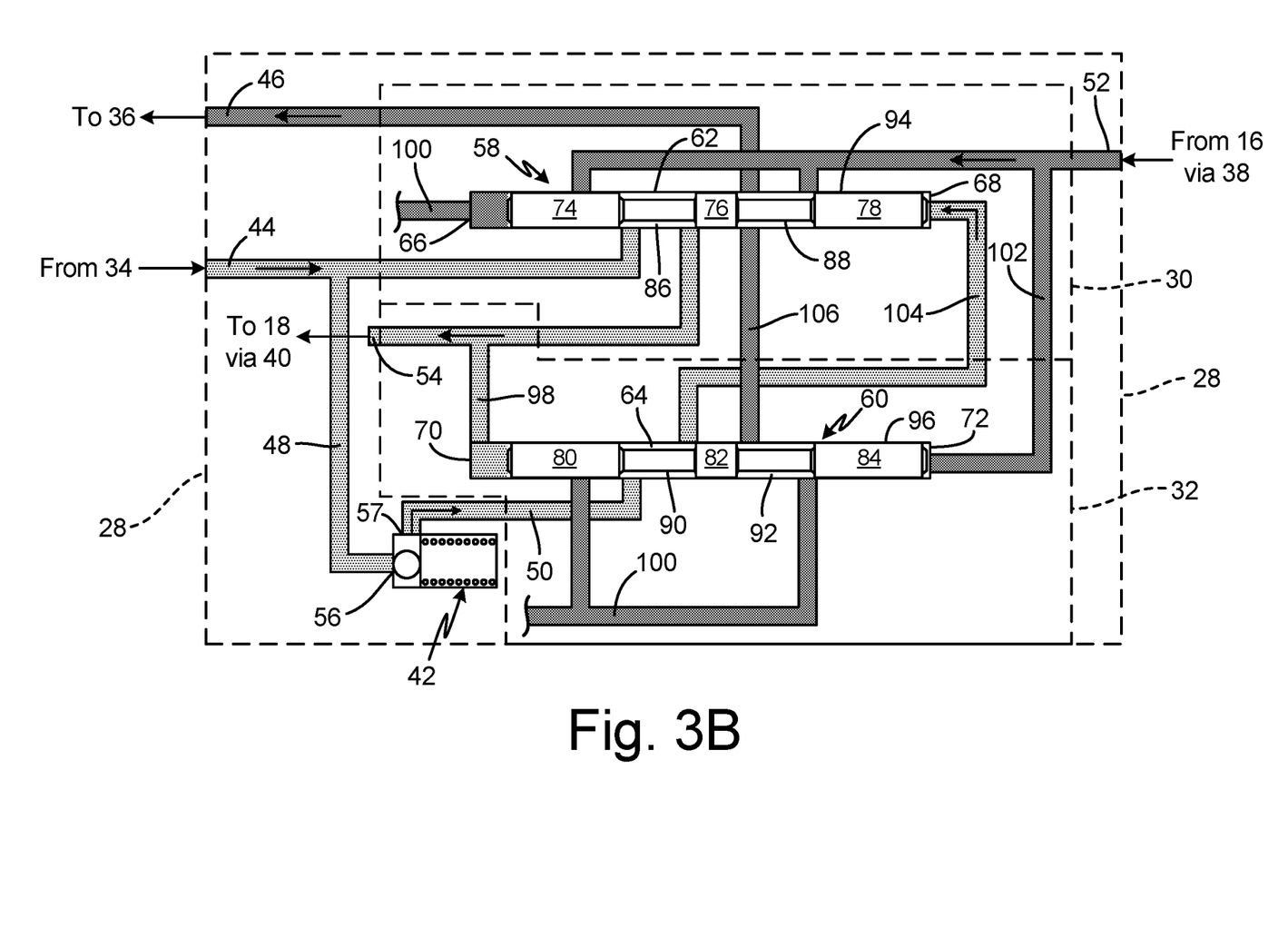

As the pressure in fluid channel 48 (and supply line 18) reaches a preset pressure value (i.e., pressure required to actuate injectors 26), relief valve 42 is opened to allow the flow of lubricant through changeover channel 50 (shown in FIG. 3B). Changeover channel 50 is fluidly connected to spool 60 through groove 90 and to spool 58 through bore end 68 and fluid channel 104. In this second phase of operation, lubricant flows from pump 12 via pump channel 44, through relief valve 42 and spool 60 (via groove 90), and to spool 58. The pressure at bore end 68 causes spool 58 to shift toward opposite bore end 66.

Figure 3C:
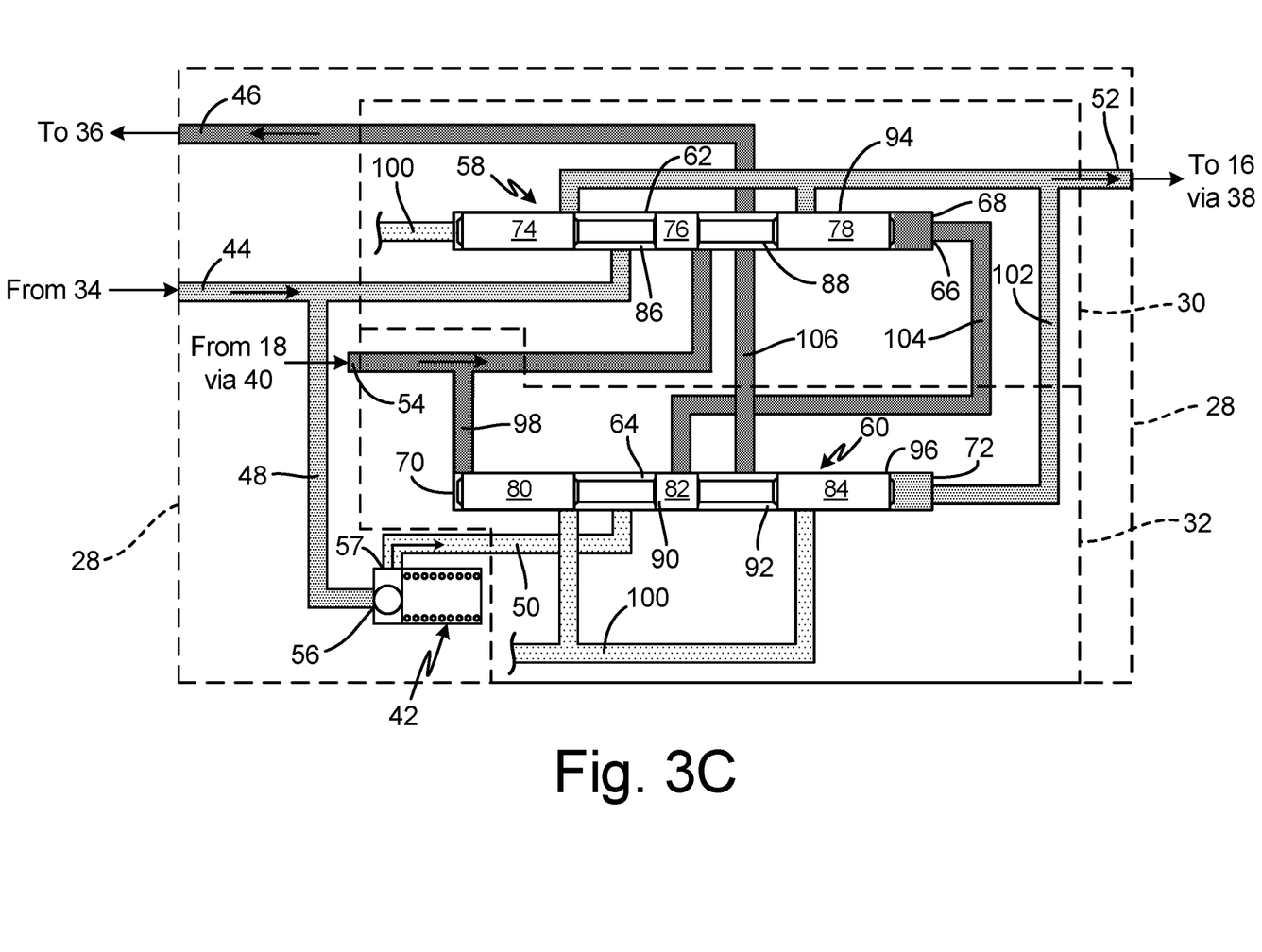

When spool 58 moves to bore end 66, pump channel 44 becomes disconnected from fluid channel 54 as land 76 blocks an inlet to fluid channel 54, and thereby interrupts the flow of lubricant from pump 12 to supply line 18 (shown in FIG. 3C). Instead, pump channel 44 becomes fluidly connected to fluid channel 52, which delivers lubricant to supply line 16. With spool 58 shifted to bore end 66, groove 86 becomes open to both pump channel 44 and fluid channel 52 thereby providing a fluid connection to supply line 16. In this third phase of operation, supply line 16 is pressurized while pressure is relieved from supply line 18. With spool 58 shifted to bore end 66, groove 88 opens to fluid channel 54 (from supply line 18) forming a fluid connection between fluid channel 54 (and supply line 18) and return channel 46, which returns lubricant back to pump reservoir 27. Pressure is also relieved between spools 58 and 60 as groove 92 of spool 60 fluidly connects bore end 68 of spool 58 to return channel 46 through fluid channels 104 and 106. As previously discussed, fluid channel 52 is fluidly connected spool 60 via bore end 72 and fluid channel 102. As fluid channel 52 is pressurized, fluid channel 102 and thereby bore end 72 is also pressurized. The force exerted on spool 60 at bore end 72 causes spool 60 to shift toward opposite bore end 70. In this position, relief valve 42 is disconnected from bore end 68 of spool 58, as the fluid connection between changeover channel 50 and channel 104 is blocked by land 82, and instead connected to bore end 66 via groove 90 of spool 60 and channel 100. Relief valve 42 remains in a closed position until a pressure required to actuate injectors 24 (FIG. 1) is reached.

Figure 3D:
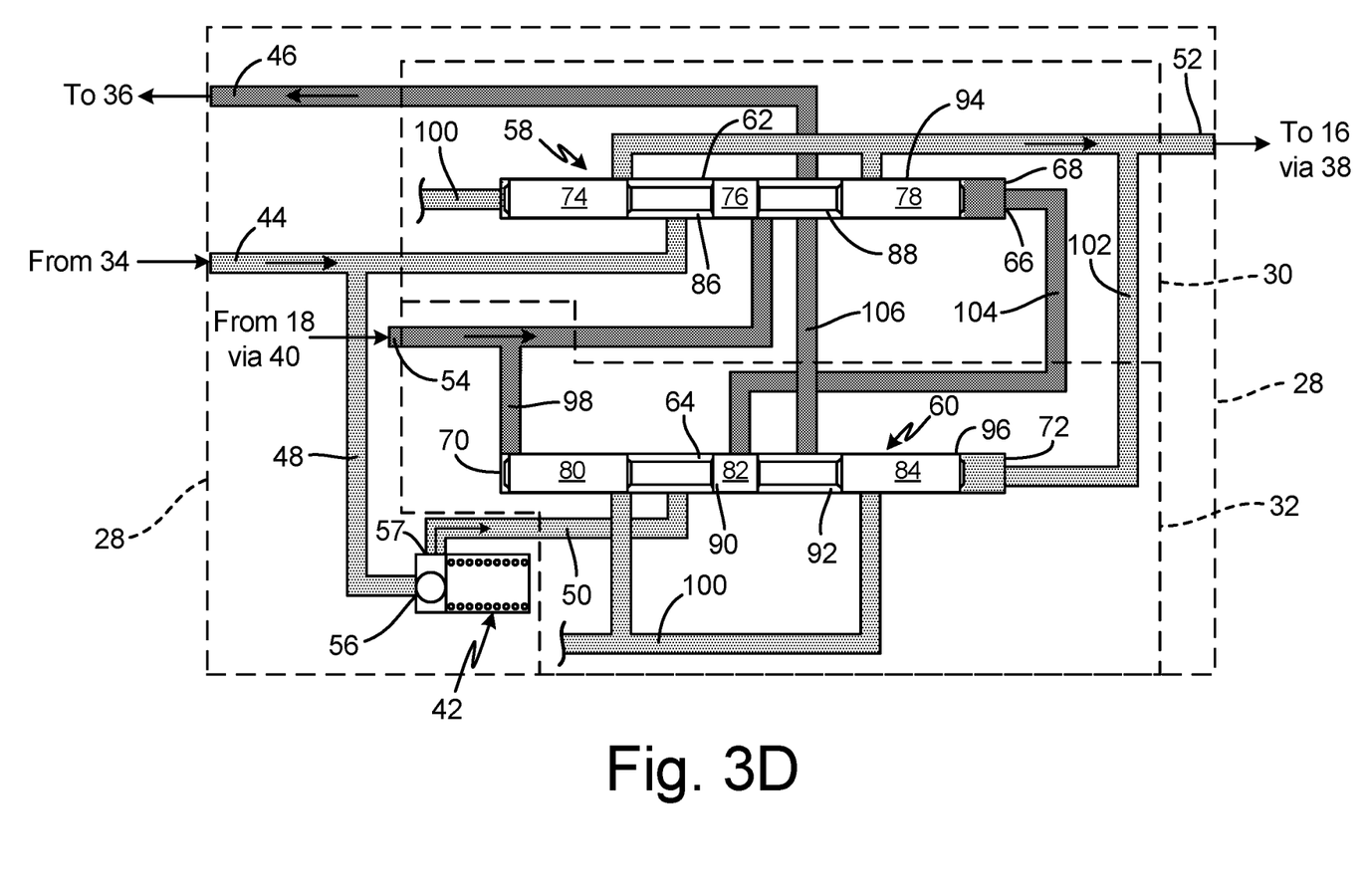

As the pressure in fluid channel 52 (and supply line 16) reaches the preset pressure value (i.e., pressure required to actuate injectors 24), relief valve 42 is opened to allow the flow of lubricant through changeover line 50 (shown in FIG. 3D). With spool 60 shifted to bore end 70, groove 90 fluidly connects changeover channel 50 to spool 58 at bore end 66 via fluid channel 100. In this fourth phase of operation, lubricant flows from pump 12 via pump channel 44, through relief valve 42 and spool 60, and to spool 58. The pressure at bore end 66 causes spool 58 to shift toward opposite bore end 68. When spool 58 is positioned at bore end 68, land 74 disconnects pump channel 44 from fluid channel 52, thereby preventing delivery of lubricant from pump 12 to supply line 16, and connects pump channel 44 to fluid channel 54, thereby causing the delivery of lubricant from pump 12 to supply line 18. As pressure builds in fluid channel 54, pressure also builds in fluid line 98, causing spool 60 to shift toward bore end 72 and return changeover valve 14 back to the first phase of operation (shown in FIG. 3A).

The first through fourth phases of operation, illustrated in FIGS. 3A-3D can automatically continue without interruption as long as lubrication system 10 is in operation. The implementation of modular changeover valve 14 into single line parallel lubrication system having two supply lines 16, 18 improves lubrication system efficiency by providing simultaneous pressurization of one supply line 16, 18 and venting of the other supply line 16, 18. Furthermore, the simplified modular, two-spool, design can be flush-mounted to a pump thereby eliminating the need for external fluid lines and allowing for replacement of individual modules (i.e., base housing 28 and spool housings 30, 32) as necessary.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A changeover valve for a single line parallel lubrication system, the changeover valve comprising:
   a base housing having a plurality of base housing fluid channels and an inlet configured to be fluidly connected to a pump outlet;
   a first housing configured to mate with the base housing in a fluid seal, the first housing comprising:
      a first spool mounted in a first cylindrical bore and hydraulically displaceable between a first and a second end of the first cylindrical bore; and
      a plurality of first housing fluid channels fluidly connected to the first cylindrical bore; and
   a second housing configured to mate with the base housing in a fluid seal, the second housing comprising:
      a second spool mounted in a second cylindrical bore and hydraulically displaceable between a third and a fourth end of the second cylindrical bore; and
      a plurality of second housing fluid channels fluidly connected to the second cylindrical bore;
   wherein at least one of the base housing, first housing, and second housing comprises a relief valve in fluid communication with one or more of the plurality of base housing, first housing, and second housing fluid channels wherein the base housing inlet is in constant direct fluid communication with an inlet of the relief valve; and
   wherein the base housing, first housing, and second housing are distinct and separable units arranged to provide direct fluid communication between base housing, first housing, and second housing fluid channels.

2. The changeover valve of claim 1, wherein the base housing further comprises
   a venting outlet configured to be fluidly connected to a fluid reservoir inlet.

3. The changeover valve of claim 1, wherein the inlet is fluidly connected through a base fluid channel and a first housing fluid channel to the first cylindrical bore.

4. The changeover valve of claim 2, wherein the base housing further comprises:
   a first outlet; and
   a second outlet;
   wherein each of the first and second outlets are fluidly connected to the first and second cylindrical bores.

5. The changeover valve of claim 4, wherein the relief valve comprises a relief valve outlet and wherein the relief valve outlet is fluidly connected to the first and second cylindrical bores.

6. The changeover valve of claim 5, wherein the relief valve is a pressure-actuated valve and wherein a pressure at which the valve opens is adjustable by increasing or decreasing tension of a spring.

7. The changeover valve of claim 5, wherein each of the first and second spools has three cylindrical lands configured to form a seal with outer walls defining the first and second cylindrical bores, wherein the three cylindrical lands on each of the first and second spools are separated from one another across a length of the first and second spools.

8. The changeover valve of claim 4, wherein the base housing is configured to be mounted directly to a pump and wherein each of the first housing and the second housing is mounted directly to a front face of the base housing such that the base housing separates the first and second housings from the pump.

9. The changeover valve of claim 8, wherein the pluralities of base fluid channels, first spool fluid channels, and second spool fluid channels are sealed at interfaces of the base housing and first and second spool housings.

10. A method of assembling a changeover valve for a single line parallel lubrication system, the method comprising:
   providing a base housing configured to be mounted to a pump, the base housing comprising:
      a plurality of base housing fluid channels,
      an inlet configured to be fluidly connected to a pump outlet;
      a venting outlet configured to be fluidly connected to a pump fluid reservoir inlet;
      a first outlet; and
      a second outlet;
   providing a first housing comprising:
      a first spool mounted in a first cylindrical bore and hydraulically displaceable between a first and a second end of the first cylindrical bore; and
      a plurality of first housing fluid channels fluidly connected to the first cylindrical bore, wherein the first cylindrical bore is fluidly connected to the first and second outlets of the base housing; and
   providing a second housing comprising:
      a second spool mounted in a second cylindrical bore and hydraulically displaceable between a third and a fourth end of the second cylindrical bore, wherein the second cylindrical bore is fluidly connected to the first and second outlets of the base housing;

a plurality of second housing fluid channels fluidly connected to the second cylindrical bore; and providing a relief valve in fluid communication with one or more of the plurality of base housing, first housing, and second housing fluid channels;

wherein the base housing, first housing, and second housing are distinct and separable units arranged to provide direct fluid communication between base housing, first housing, and second housing fluid channels, wherein the first and second housing are mounted to a front face of the base housing such that when assembled with the pump, the base housing separates the first and second housings from the pump.

11. The method of claim 10 and further comprising:
fluidly connecting the inlet to a relief valve inlet through a base fluid channel.

12. The method of claim 11 and further comprising:
fluidly connecting the inlet to the first cylindrical bore through a base fluid channel.

13. The method of claim 10 and further comprising:
connecting a relief valve outlet to the first and second cylindrical bores.

14. The method of claim 13 and further comprising:
adjusting a pressure set point of the relief valve to cause the relief valve to open after a fluid has been discharged from an injector in a line of the parallel lubrication system.

15. The method of claim 10 and further comprising:
connecting the first outlet of the base housing to a first line of injectors in the parallel lubrication system; and
connecting the second outlet of the base housing to a second line of injectors in the parallel lubrication system.

16. A changeover valve for a single line parallel lubrication system, the changeover valve comprising:
a base housing comprising:
a plurality of base housing fluid channels;
an inlet configured to fluidly connect to a pump;
a first outlet configured to fluidly connect to a first line of injectors of the parallel lubrication system;
a second outlet configured to fluidly connect to a second line of injectors of the parallel lubrication system;
wherein the changeover valve is configured to deliver fluid to the first and second lines of injectors through the first and second outlets, respectively, and is configured to receive fluid from the first and second lines of injectors through the first and second outlets, respectively a first housing configured to mate with the base housing in a fluid seal, the first housing comprising:
a first spool mounted in a first cylindrical bore and hydraulically displaceable between a first and second end of the first cylindrical bore; and
a plurality of first housing fluid channels fluidly connected to the first cylidrical bore, wherein the first cylindrical bore is fluidly connected to the first and second outlets of the base housing; and a second housing configured to mate with the base housing in a fluid seal, the second housing comprising:
a second spool mounted in a second cylindrical bore and hydraulically displaceable between a third and a fourth end of the second cylindrical bore; and
a plurality of second housing fluid channels fluidly connected to the second cylindrical bore, wherein the second cylindrical bore is fluidly connected to the first and second outlets of the base housing;

wherein at least one of the base housing, first housing, and second housing comprises a relief valve in fluid communication with one or more of the plurality of base housing, first housing, and second housing fluid channels, wherein the relief valve is configured to open after a fluid has been discharged from an injector in one of the first and second lines of injectors; and wherein the base housing, first housing, and second housing are distinct and separable units arranged to provide direct fluid communication between base housing, first housing, and second housing fluid channels.

17. The changeover valve of claim 16, wherein the base housing is in constant direct fluid communication with an inlet of the relief valve.

18. The changeover valve of claim 16, wherein each of the first housing and the second housing are mounted directly to a face of the base housing, such that upon assembly with the pump, the base housing separates the first and second housings from the pump.

19. The changeover valve of claim 16, wherein the relief valve has an adjustable pressure set point.

* * * * *